Aug. 22, 1939.  W. F. RIDGWAY  2,170,159

DRIVE MECHANISM

Filed Aug. 27, 1937   2 Sheets-Sheet 1

INVENTOR
William F. Ridgway
By Parker, Carlson, Pitzner + Hubbard
ATTORNEYS

Aug. 22, 1939.  W. F. RIDGWAY  2,170,159
DRIVE MECHANISM
Filed Aug. 27, 1937  2 Sheets-Sheet 2
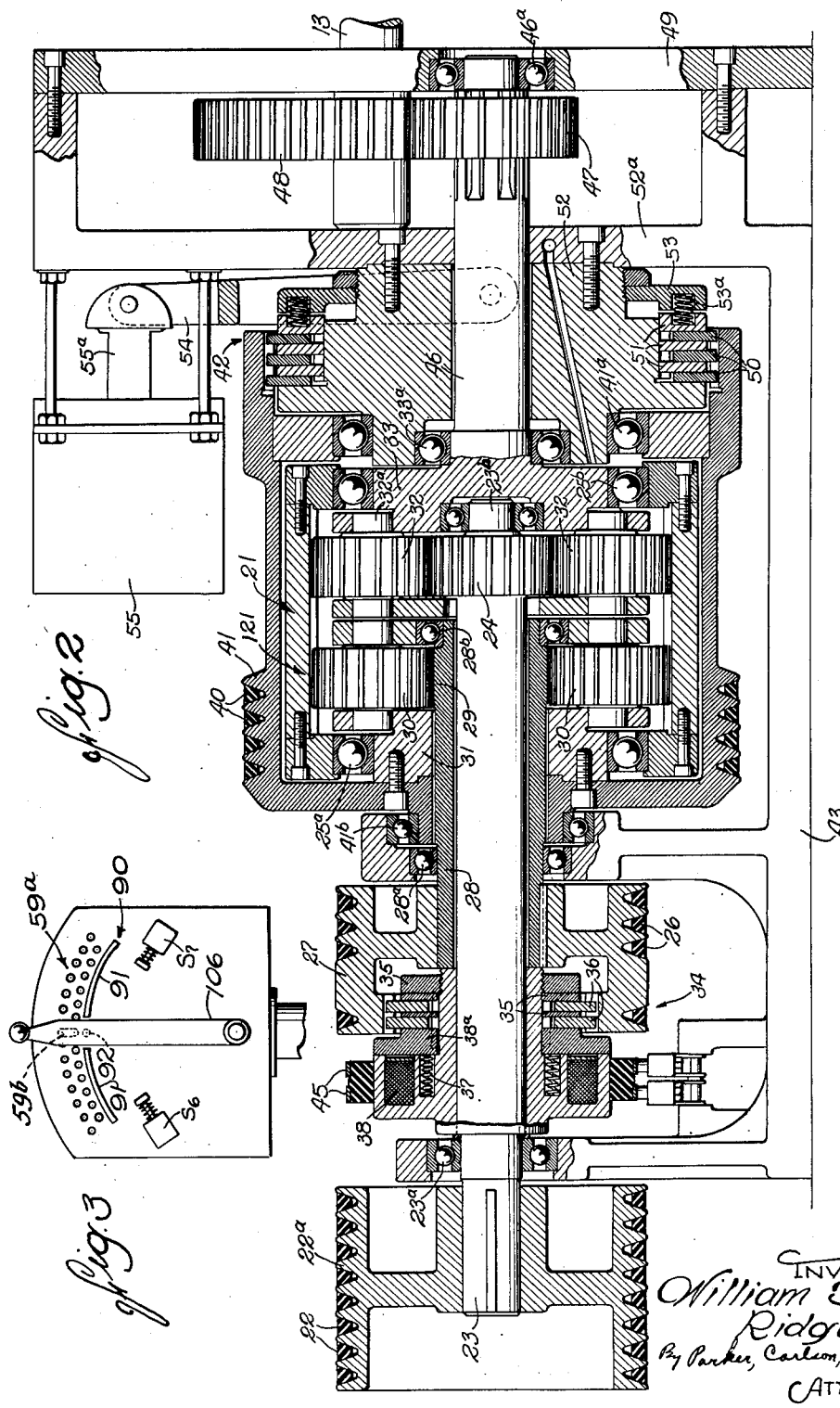

Patented Aug. 22, 1939

2,170,159

UNITED STATES PATENT OFFICE 2,170,159

DRIVE MECHANISM

William F. Ridgway, Rockford, Ill., assignor to The Ingersoll Milling Machine Company, Rockford, Ill., a corporation of Illinois Application August 27, 1937, Serial No. 161,196

19 Claims. (Cl. 90—21)

This invention relates to mechanisms for driving the reciprocable elements thereof at selectively variable rates of feed.

One object of the present invention is to provide a novel drive mechanism of the mechanical type by which a reciprocable machine element may be moved in one direction or the other at a speed which may be varied progressively through a wide range without the necessity of reversing the prime movers of the installation.

A further object of the invention is to provide a mechanism of the type set forth by means of which a plurality of unidirectional feed motors may be utilized to actuate a reversibly movable machine element in one direction or the other at selectively variable rates of feed.

Another object is to provide for actuation of the machine element at a rapid traverse rate without altering the control settings of the feed motors.

The invention also resides in the novel manner of interlocking the feed motors during starting thereof and the compact arrangement of the differential gearing employed.

Other objects and advantages of the invention will become apparent from the following detailed description taken in connection with the accompanying drawings, in which—

Fig. 2 is an enlarged longitudinal sectional view of the differential gearing included in the driving mechanism.

Fig. 3 is an elevational view of one form of manual controller.

Figure 1:
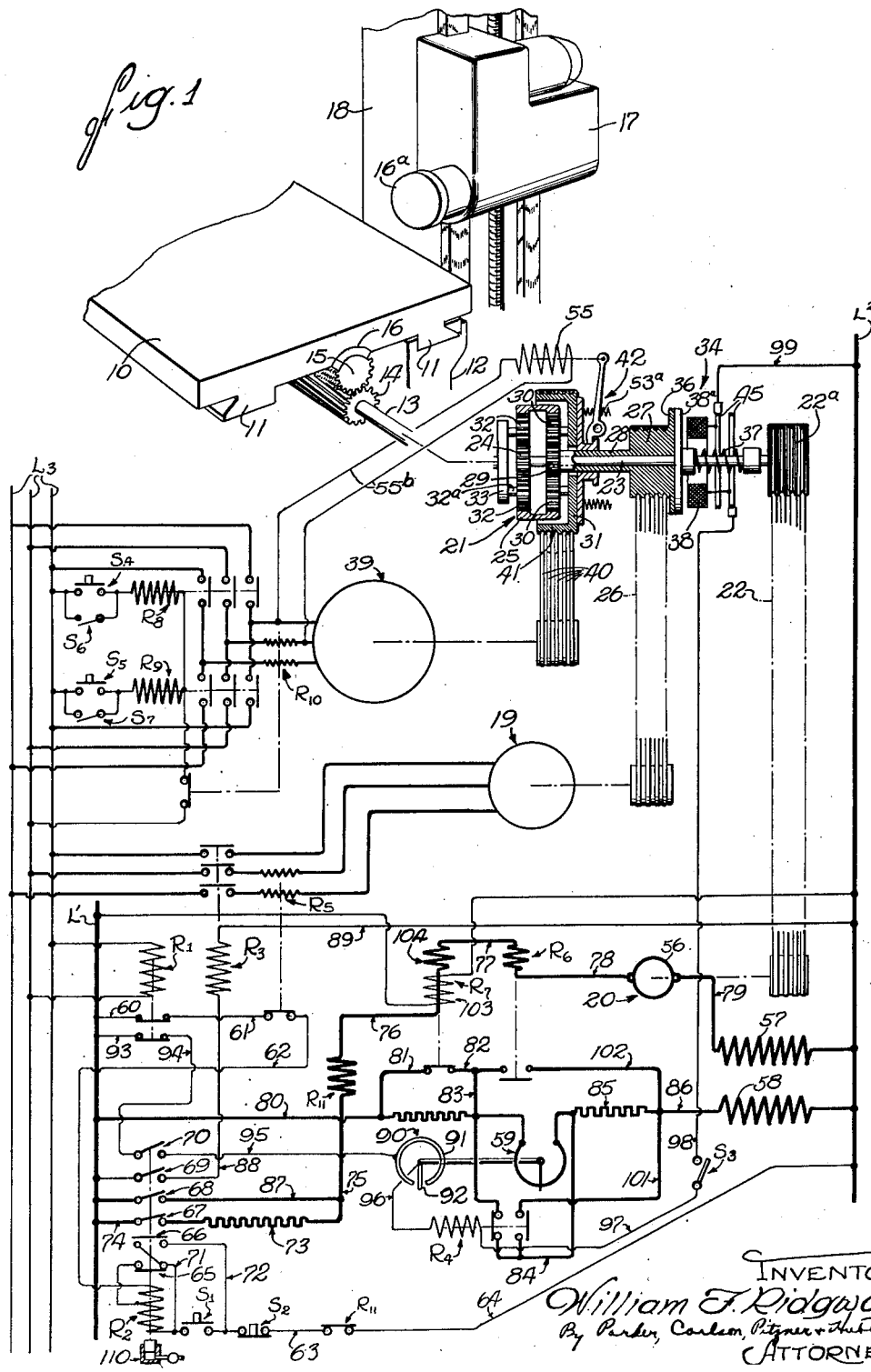
Figure 1 is a schematic view and wiring diagram illustrating a machine tool equipped with a driving mechanism embodying the present invention.

For purposes of illustration of its various novel features, the invention has been shown herein as embodied in a mechanism for driving the work table of a milling machine. It will be understood by those skilled in the art, however, that the invention is applicable to a variety of other types of machines. I do not therefore intend to limit the invention by the present disclosure but aim to cover all modifications and alternative constructions falling within the spirit and scope of the invention as expressed in the appended claims.

In the milling machine shown, the table indicated by the numeral 10, is mounted for endwise movement in dovetail guides 11 on a bed 12. Reciprocation of the table is effected by rotating a drive shaft 13 carrying an elongated helical toothed pinion 14 meshing with a screw or worm 15 which in turn meshes with a rack or partial nut 16 fast on the under side of the table. A cutting tool illustrated in the form of a face milling cutter 16a is carried by a unitary tool head 17 vertically adjustable on a fixed column 18 and is adapted to machine a work piece carried by the table 10.

The driving mechanism with which the invention is particularly concerned is arranged to drive the shaft 13 to advance the table 10 in either direction at any selected feed rate which may be varied progressively or at a rapid traverse rate. Generally stated, the mechanism comprises two unidirectional power actuated devices such as electric motors 19 and 20 connected to the table 10 through a differential gearing in a novel manner such that the speed and direction of movement for the table may be controlled by varying the relative speeds of the two motors without changing their directions of rotation. One of the motors operates through a second differential gearing so that rapid traverse motion of the driven part will be produced when a normally stationary part of the second gearing is driven by a third motor 39.

In the particular construction illustrated, motors 19 and 20 are connected to the respective terminal members of a primary differential gearing designated generally by the numeral 21 and having an intermediate or driven member 33 connected to the drive shaft 13 through the medium of a shaft 46 on which the member is carried and gears 47 and 48. The feed motor 20 is connected through belts 22 to a pulley 22a on a shaft 23 having fast thereon the sun gear 24 of the differential gearing 21. The gears 24 and 25 which constitute the terminal members of the gearing 21 mesh with planet gears 32 rotatable on shafts 32a which are carried by a spider 33.

The other feed motor 19 is connected to the other terminal member of the differential gearings shown as a ring gear 25. Instead of being connected directly to the ring gear 25 as would be the case in a simple differential gearing, the connection from the motor 19 is made through a second differential gearing indicated generally at 121 and arranged coaxially with respect to the gearing 21. This connection includes belts 26 passing over a pulley 27 fast on a sleeve 28 which is loose on the shaft 23. A sun gear 29 fast on the sleeve 28 meshes with planetary pinions 30 carried by a bodily rotatable spider 31 and meshing with the ring gear 25. When the spider 31 is held against rotation, the planet gears 30 will be rotated about their respective axes in response to the rotation of the meshing sun gear 29 and in turn will cause rotation of the ring gear 25.

With the motors connected as above described to the terminal members 24 and 25 of the gearing 21, the speed of rotation as well as the direction of rotation of the drive shaft 13 will be a function of the relative speeds of the terminal members. When the terminal members are maintained in synchronism, that is, rotated at equal peripheral speeds, the shaft 13 will remain stationary. If the speed of one of the members, for example, the sun gear 24, is increased or decreased above and below the speed of the ring gear 25, the planet gears 32 will be rotated bodily in one direction or the other within the ring gear depending upon the relative speeds.

Preferably, one of the feed motors, for example, the feed motor 19 is maintained at constant speed while the speed of the other feed motor is selectively variable by a suitable control device whereby to effect feeding of the table 10 at the desired rate.

In maintaining the table 10 stationary, it is necessary that the feed motors be operated at speeds which will maintain the terminal members 24 and 25 in exact synchronism. In other words, the terminal members must move with equal peripheral speeds. This motor speed relation may conveniently be termed a "balanced" relation. It will be understood that the individual motor speeds may or may not be equal in this balanced condition depending upon whether the speed ratios of the connections between the motors and their respective terminal members are equal. For the sake of simplicity of explanation, it will be assumed that a balanced speed relation is had in the illustrative embodiment of the invention when the motors 19 and 20 are operating at the same or synchronized speeds.

In the event that the feed motors are energized from separate power sources, the use of electrical means to obtain the desired balanced speed relation of the differential gearing terminal elements may be difficult of accomplishment. Consequently, it is desirable that some means be provided for mechanically locking the terminal members of the differential gearing in synchronism during such time as it is necessary to maintain the table 10 stationary. For this purpose, a clutch 34 has been provided which includes plates 35 carried by the shaft 23 and normally biased by a spring 37 into frictional gripping engagement with complemental plates 36 splined on the sleeve 28. The clutch is normally held engaged by the spring 37 which acts on the armature 38ª of an annular electromagnet 38 which, when energized, attracts the armature and relieves the gripping pressure. Current is supplied to the magnet winding through slip rings 45. The clutch, when engaged, serves to lock the sleeve 28 and coaxial shaft 23 against relative rotation so that any creeping of the table will be prevented.

The secondary differential gearing 121 above described permits the table drive shaft 13 to be driven at a rapid traverse speed by the motor 39 without stopping the motors 19 and 20. The motor 39 is reversible and is connected through belts 40 with a pulley 41 fast on the spider 31 which carries the planet gears 30. It will be seen that the rapid traverse motor 39 may be utilized to impart bodily rotation to the planetary gears 30 at a relatively high rate of speed thus causing the ring gear 25 to rotate at a high rate whereby to drive the member 33 at an increased rate through the medium of the planet gears 32. Thus, the table 10 is advanced at rapid traverse in a direction corresponding to the direction of rotation of the motor 39.

When the motor is idle, the pulley 41 and the connected spider 31 are held against rotation by a suitable brake designated generally by the numeral 42. This includes a series of friction rings 50 splined on one end of the pulley 41 and alternating with similar rings splined on an annular block 52 fixed to a stationary plate 52ª. Spring 53ª are interposed between an axially shiftable disk 53 and one of the terminal rings 51. Upon energization of a solenoid 55 having an armature 55ª, a link 54 is actuated to urge the disk 52 in a direction to release the brake. The brake is applied automatically when the solenoid becomes deenergized.

Upon reference to Fig. 2, it will be seen that the primary and secondary differential gearing 21 and 121 are disposed coaxially and these together with the brake 42 are arranged compactly within a housing formed by the pulley 41. The latter is journaled in bearings 41ª and 41ᵇ supported by a frame 43 with which the plate 52ª is integral. The shaft 23 is supported by a bearing 23ª on the frame 43 and a bearing 23ᵇ carried by the spider 33 which in turn is supported in bearings 33ª. The bearing 28ª supports one end of the sleeve 28, the other being journaled in a bearing 28ᵇ also carried by the spider 31. The spider 31 rotates on the sleeve 28 and the ring gear 25 is supported at opposite ends by bearings 25ª and 25ᵇ. The end of the shaft 46 remote from the spider 33 is journaled in a bearing 46ª supported in a plate 49 rigid with the plate 52ª and supporting one end of the shaft 13.

A control arrangement is preferably utilized which is of such character that the drive mechanism may be controlled from a single station located either on the machine or at a remote point. In the exemplary embodiment shown, the feed motor 20 has been illustrated as a direct current motor having an armature 56, a series field 57, and a shunt field 58, all arranged to be energized from direct current supply lines $L_1$ and $L_2$. The constant speed feed motor 19 and rapid traverse motor 39 have been illustrated as alternating current motors energized from three-phase alternating current supply lines $L_3$. The control circuits for the motors are energized from the direct current supply lines, and a suitable interlock relay $R_1$ is arranged to prevent energization of the direct current feed motor 20 except when alternating current is available for the constant speed feed motor 19.

The feed motors are preferably stopped and started by common switches shown as a normally open "start" push button switch $S_1$ and a normally closed "stop" push button $S_2$, which serve to control the motor circuits through the medium of a main electromagnetic switch or relay $R_2$ and a constant speed feed motor relay $R_3$. A manually adjustable rheostat 59 interposed in the shunt field circuit of the feed motor 20 serves to vary its speed in order to control the direction and rate of drive of the table 10. A single manually operable feed switch $S_3$ may be used to cut this rheostat into and out of circuit, through the medium of a relay $R_4$, as well as to control the energization of the clutch solenoid 38 in locking the motors in synchronism. In addition to the supply line interlock previously noted, the safe operation of the feed motors is further insured by the utilization of overload relays $R_5$ and $R_{10}$ interposed respectively in the supply circuits of the feed motors 19 and 20. Also accelerating and decelerating relays $R_6$ and $R_7$ connected in the supply circuit of the feed motor 20 respectively serve to limit the current during acceleration and deceleration of the variable speed feed motor 20.

The operation of the rapid traverse motor is, on the other hand, governed by a separate set of control circuits including a pair of normally open push button switches $S_4$ and $S_5$ which respectively control reversing contactors or relays $R_8$ and $R_9$. This motor is protected by an overload relay $R_{10}$ having its contacts interposed in the energizing circuit of the reversing relays $R_8$ and $R_9$.

Operation of the feed motors 19 and 20 is initiated by a momentary closure of the starting push button switch $S_1$ which serves to complete an energizing circuit ($L_1$—60—$R_1$—61—$R_5$—62—$R_2$—
$S_1$—$S_2$—63—$R_{11}$—64—$L_2$)

for the run relay $R_2$. This run relay is equipped with a dash pot 110 or other suitable timing device for causing sequential operation of a series of contacts 65 to 70 all of which are normally open except the contacts 65. It will be noted that the relay is provided with a sectional actuating winding, a second portion of which is cut into circuit upon the initial opening of the contact 65. Closure of the second contact 66 completes a sealing circuit through conductors 71 and 72 about the starting switch $S_1$ so that the run relay will remain closed after the starting switch is released.

Closure of the third set of contacts 67 energizes the feed motor 20 with a starting resistor 73 in series with the armature (through a circuit $L_1$—74—67—73—75—$R_{11}$—76—$R_7$—
77—$R_6$—78—56—79—57—$L_1$).

It will be noted that the shunt field 58 of the feed motor 20 is energized as soon as power is supplied to the supply lines $L_1$—$L_2$ (through a circuit $L_1$—80—81—$R_7$—82—83—$R_4$—
84—85—86—58—$L_2$).

This energizing circuit for the shunt field includes the resistor 85, which is preset in the factory assembly of the apparatus to synchronize the speed of the feed motor 20 with that of the feed motor 19 when both are operating at their rated voltages. Closure of the fourth set of contacts 68 of the run relay $R_2$ completes a shunt circuit about the starting resistor 73 through a conductor 87 so that at this point in the sequential closing of the contacts of the run relay the feed motor 20 is conditioned for normal operation.

Upon the subsequent closure of the fifth set of contacts 69, the feed motor relay $R_3$ is energized (through a circuit $L_1$—69—88—$R_3$—89—$L_2$) to thereby connect the feed motor 19 to its supply lines $L_3$. Finally, the closure of the last set of contacts 70 of the run relay conditions the rheostat controlling relay $R_4$ for subsequent operation. During starting of the motors, the clutch 34 remains engaged for reasons to appear later, and the feed motors 19 and 20 are locked in synchronism. As a result, no movement of the table will take place during the starting of the feed motors despite any dissimilarities in their rate of acceleration.

After the feed motors have thus been started in operation, the switch $S_3$ is closed to condition the control circuits for disengaging the clutch 34 and for varying the speed of the feed motor 20 to traverse the table 10. When the rheostat 59 is set in its mid-position as illustrated, the shunt field excitation for the motor 20 is such as to cause it to operate substantially in synchronism with the feed motor 19. In order to avoid any creeping of the table, however, due to variations in speed resulting, for example, from changes in the supply line voltage, a switch 90 is interposed in the circuit of the rheostat relay $R_4$ so that the rheostat 59 will be cut out of circuit and the clutch 34 maintained in engagement when the rheostat is set for this synchronous operation even though the feed switch $S_3$ may be closed. Thus, it will be seen that the switch 90 includes an arcuate contact plate 91 and a cooperating pivoted arm 92 movable with the rheostat arm. When the rheostat arm is set in its mid-position as shown in Fig. 1, the switch arm 92 is disposed out of contact with the arcuate contact 91 thereby interrupting the circuit of the relay $R_4$. Preferably the ends of the arcuate contact 91 are spaced apart a substantial distance as shown so that the desired circuit interruption will be had even though the rheostat is set only approximately in its neutral position. This interlocked switching arrangement is particularly advantageous since it is unnecessary for the operator to remember to open the feed switch $S_3$ in order to engage the clutch 34 for maintaining the feed motors in balanced speed relation. After the feed switch has been closed, however, movement of the rheostat 59 to vary the speed of the feed motor 20 will automatically close the switch 90 thereby energizing the relay $R_4$ (through a circuit $L_1$—93—$R_1$—94—70—95—90—96—$R_4$—97—$S_3$—98—38—99—$L_2$). It will be seen that completion of this circuit also energizes the clutch actuating solenoid 38 so as to disengage the clutch 34 and thereby permit the drive mechanism to traverse the table 10 at a speed determined by the relative speeds of the feed motors 19 and 20. Upon such energization of the relay $R_4$, the rheostat 59 is cut into the shunt field circuit of the motor 20 by opening the shunt connection previously made through conductors 83 and 84 and at the same time a shunt is closed about the synchronizing resistance 85 through conductors 84 and 101. It will be seen that the direction of traversing movement of the table 10 may be changed by shifting the arm 106 to one side or the other of its neutral or mid-position so as to operate the feed motor 20 at a speed either above or below that of the constant speed feed motor 19. The acceleration relay $R_6$ serves to limit the current during acceleration of the feed motor 20 to a safe value. Thus, if the armature current increases above a predetermined value during starting, the relay $R_6$ completes a shunt circuit (81—$R_7$—82—$R_6$—102) about the resistances in the shunt field circuit thereby increasing the shunt field and momentarily arresting the acceleration of the motor. Then, as soon as the armature current drops to a safe value, the relay $R_6$ opens. In the event that the rheostat 59 is shifted quickly through a wide range to effect a large increase in speed of the feed motor 20, the accelerating relay $R_6$ will operate periodically as the speed of the motor increases in order to limit the rate of acceleration to the desired safe value.

The deceleration relay $R_7$ is similarly effective to limit the rate of deceleration of the feed motor 20. It will be seen that this relay is provided with a constantly energized actuating winding 103 connected across the supply lines L1—L2 and normally tending to open the relay contacts, this winding being arranged in opposition to a winding 104 interposed in the motor armature circuit. In the event that the armature current rises to a predetermined maximum value in the reverse direction due to the counter voltage generated by rapid deceleration of the motor, the flux created by the winding 104 adds to the flux of winding 103 sufficiently to cause opening of the associated relay contacts, thereby removing the shunt 81—R7—82—83 about a decelerating resistance 105 in the shunt field circuit. When the resistance 105 is thus cut into the shunt field circuit, the deceleration of the motor is momentarily arrested thereby decreasing the armature curent so that the decelerating relay is again closed. As in the case of the accelerating relay, the decelerating relay R7 operates on and off to limit the current during deceleration in the event that the rheostat 59 is suddenly shifted to effect a large decrease in the speed of the feed motor 20.

It will thus be seen that the table 10 may be advanced in either direction at a feed rate which is variable at will under the control of the rheostat 59. Since the direction of feed may be reversed without changing the direction of rotation of either of the feed motors 19 and 20, it will be apparent that this change in direction of movement of the table can be accomplished smoothly and with great rapidity. As a consequence, it is possible to exercise a great nicety of control in advancing the table, for example, at a gradually decreasing speed to a particular point for performing a desired machining operation. In addition, as soon as the rheostat 59 is turned to its neutral or mid-position for stopping the table, the clutch 34 is automatically engaged to mechanically lock the table in stopped position. While the main terminal elements of the differential gearing are thus held in synchronism by the clutch 34, any undue strain or wear on the clutch is prevented by the automatic substitution of the synchronising resistor 85 for the rheostat 59.

It is frequently desirable to move a machine tool element such as the table 10 at a rapid traverse rate. The rapid traverse motor 39 may conveniently be utilized for this purpose. Thus, in advancing the table 10 from an initial position to one in which the machining operations are to be performed, the traversing movement may be had at a rapid rate by closure of the normally open push button switch S4 which connects the rapid traverse motor 39 to the alternating current supply lines L3 by closure of the associated relay R8. When thus energized, the rapid traverse motor 39 rotates the ring gear 25 at a relatively high rate of speed through the medium of the secondary planet pinions 30 as heretofore described. It will be noted that as soon as the rapid traverse motor 39 is energized, solenoid 55 of the brake 42 is also energized through conductors 55b, thus releasing the brake 42 and permitting the necessary bodily movement of the secondary planetary pinions 30. Rotation of the rapid traverse motor 39 in the opposite direction to effect a rapid return movement of the table 10 is had by closure of the normally open push button switch S5 which in turn energizes the associated relay R9 to connect the rapid traverse motor to the supply lines L3 for rotation in the opposite direction.

The rapid traverse motor control switches S4 and S5 are preferably biased to their open positions so that the rapid traverse operation can only be had while the operator deliberately holds one or the other of these switches closed and a suitable interlock may be provided therebetween to prevent simultaneous closure. It will be noted that as soon as these switches are opened the rapid traverse motor is not only deenergized but the brake solenoid 55 is also open-circuited so that the brake 42 immediately engages and prevents further bodily movement of the secondary planetary pinions 30 which might otherwise be had upon coasting of the rapid traverse motor. As soon as the rapid traverse operation is completed, the table will be traversed through the medium of the feed motors 19 and 20 at a speed and in a direction determined by the previous setting of the rheostat 59. The indicating scale for this rheostat furnishes the operator with a continuous visual indication of the feed motion which will be initiated as soon as the rapid traversing operation is completed. If desired, the setting of the rheostat 59 may be varied during the course of the rapid traverse operation without interfering with the latter.

In the event that it is desired to have a plurality of successive rapid traverse and feed movements of the machine tool, as, for example, when a plurality of work pieces are positioned at spaced points longitudinally of the table 10, the control arrangement heretofore described may be conveniently utilized for this purpose. In such case, the table may be advanced at a rapid traverse rate until the first work piece is located adjacent the milling cutter 16a at which time the rapid traverse motor 39 is deenergized and the traversing continued at a relatively slower feed rate determined by a previous setting of the rheostat 59. Upon the completion of the milling of the first work piece, the rapid traverse motor is again energized and the table traversed until the second work piece is adjacent the milling cutter. Then when the rapid traverse motor is again deenergized, the table will continue its advance at the same feed rate which was set for the first work piece. The necessity of repeatedly resetting the feed rate is thus avoided.

For some applications, it is desirable to provide for actuation of the rapid traverse motor switches and the rheostat 59 by a single manually operable controller. Fig. 3 illustrates such a controller 59a indicating different steps of the rheostat 59 and S6 and S7 being additional switches for initiating operation of the rapid traverse motor 39 in opposite directions. A manually operable handle 106 pivoted on the control box carries the contact 92 and also a contact 59b for engaging the rheostat contacts 59a. As the arm is moved in either direction out of the neutral position shown, the rheostat 59 is operated to initiate feeding of the work table 10, the rate of feed increasing progressively in the continued movement of the arm. Finally, after the maximum feed rate has been attained, the arm encounters the movable contact of the switch S7 which, when closed, initiates operation of the motor 39 to initiate rapid traverse movement of the table in the same direction as the feed motion then occurring. Similarly, movement of the arm 106 beyond the other maximum reverse feed position results in closure of the switch S6 to initiate rapid traverse of the table in the same direction as the feed motion.

With the control arrangement above described, the operator may govern all of the motions of the table by manipulating a single lever and may readily gauge the starting of a feed or rapid traverse motion with reference to one of the motions already occurring. In addition, the arrangement facilitates rapid approaching the work to the tool to operate thereon inasmuch as the operator may, after rapid traversing the table close to the desired position, condition the control for rapid feeding and then decelerate the table progressively by moving the control lever toward the neutral position.

I claim as my invention:

1. The combination of a machine element mounted for movement in opposite directions, differential gearing including two separate sun gears meshing with two separate intermediate planet gears, a common ring gear meshing with both of said planet gears, first and second rotatably mounted spiders supporting said planet gears for bodily movement about the axes of the respective sun gears, a driving connection between said first spider and said machine element, means for connecting one of said sun gears to a unidirectional constant speed driving member, means for connecting the other of said sun gears to a variable speed driving member, means for connecting said second spider to a relatively high-speed rapid-traverse driving member, means operable at will to hold said second spider against rotation to thereby establish a constant speed-ratio driving connection between said second sun gear and said ring gear, and means operable at will for preventing relative rotation between said sun gears to maintain said machine element stationary.

2. The combination of a machine element mounted for movement in opposite directions, differential gearing including first and second intermediate elements cooperating respectively with first and second separate terminal members and with a common terminal member, means for connecting said first intermediate member to said machine element, means for connecting one of said separate terminal members to a unidirectional constant speed driving member, means for connecting the other of said separate terminal members to a variable speed driving member, and means for connecting said second intermediate member to a relatively high speed rapid traverse driving member.

3. The combination of a movable machine element, two differential gears each having one terminal member connected to rotate in unison with a terminal member of the other gear, means connecting the intermediate member of one of said gears to said machine element, and three separate driving elements respectively connected to the other terminal members and the other intermediate member of said gears.

4. The combination of a movable machine element, two differential gears each having one terminal member connected to rotate in unison with a terminal member of the other gear, means connecting the intermediate member of one of said gears to said machine element, three separate driving elements respectively connected to the other terminal members and the other intermediate member of said gears, and selectively operable means for locking said last mentioned intermediate member against rotation.

5. The combination of a movable machine element, two differential gears each having one terminal member connected to rotate in unison with a terminal member of the other gear, means connecting the intermediate member of one of said gears to said machine element, means for rotating the intermediate member of the other gear at a high speed for producing rapid traverse motion of said element, means for rotating the other terminal member of one of said gears unidirectionally at constant speed, means for rotating the other terminal member of the other gear at a selectively variable speed, and selectively operable means for holding said second intermediate member against rotation.

6. The combination of a machine element, a differential gearing including first and second terminal members and an intermediate member, means for connecting said intermediate member to said machine element, unidirectional power actuating means for rotating one of said terminal members at a constant speed, a second unidirectional power actuating means for driving the other of said terminal members at a selectively variable speed either greater or less than that of said one terminal member to vary both the speed and direction of rotation of said intermediate member, and means operable at will for mechanically connecting said terminal members to positively hold the same in synchronism and thereby maintain said machine element stationary.

7. The combination of a machine element, differential gearing embodying first and second terminal members and an intermedate member, the member being operatively connected to said machine element, a constant speed driving element connected to said first terminal member, a second driving element connected to said second terminal member, adjusting means for varying the speed of said second driving element above and below a value at which said terminal members are synchronized, means operative at will for mechanically connecting said terminal members to positively maintain the same in synchronism, and means responsive to a setting of said adjusting means for synchronous operation to automatically render said last named means operative.

8. The combination of a movable machine element, differential gearing embodying first and second terminal elements and an intermediate element, the latter being operatively connected to said machine element, separate driving members for rotating said terminal elements, adjusting means for varying the relative speeds of said driving members from a value at which said terminal members are synchronized, means operative at will for mechanically connecting said terminal elements to positively maintain the same in synchronism, and means responsive to a setting of said adjusting means for synchronous operation automatically to render said last named means operative.

9. The combination of a machine element, differential gearing embodying first and second terminal members and an intermediate member, the member being operatively connected to said machine element, a constant speed driving element connected to said first terminal member, a second driving element connected to said second terminal member, adjusting means for varying the speed of said second driving element above and below a value at which said terminal members are synchronized, means including a releasable clutch for positively maintaining said members in synchronism, and means responsive to a setting of said adjusting means for synchronous operation to automatically engage said clutch.

10. The combination of a movable machine element, differential gearing embodying first and second terminal members and an intermediate member, the latter being operatively connected to said machine element, a constant speed electric motor connected to said first terminal member, a variable speed electric driving motor connected to said second terminal member, said variable speed motor being provided with a shunt field and an energizing circuit therefor, means including a resistor of fixed value in said shunt field circuit for causing said variable speed motor to rotate at a balanced speed with respect to said other motor at which said terminal members are synchronized, a clutch for releasably holding said terminal members against relative rotation, a variable resistance rheostat arranged to be substituted in said circuit for said resistor and having an intermediate resistance value equal to the resistance of said resistor, control means operable to engage said clutch and to simultaneously cut said resistor into said circuit and said rheostat out of said circuit, and means including a switch movable with said rheostat for actuating said control means.

11. The combination of a machine element, differential gearing embodying first and second terminal members and an intermediate member, the latter being operatively connected to said machine element, a constant speed driving member connected to said first terminal member, a variable speed electric driving motor connected to said second terminal member and having an electrical speed controlling circuit, means including a resistor of fixed value in said circuit for causing said motor to operate at a speed at which said terminal members are synchronized, adjusting means including a rheostat in said circuit for varying the speed of said motor above and below said speed at which said terminal elements are synchronized, and control means selectively operable to render said rheostat or said synchronizing resistor operative and the other inoperative.

12. The combination of a movable machine element, power actuating means including an electric motor for imparting motion to said element only when the speed of said motor is above or below a predetermined value, control means operable at will to vary the speed of said motor through a range including said predetermined value, and means operative in response to a setting of said control means at which the speed of said motor approximates said predetermined value for positively preventing said power actuating means from moving said element.

13. The combination of a machine element, a differential gearing embodying first and second terminal members and an intermediate member operatively connected to said element, an alternating current motor connected to said first terminal member to rotate the same at constant speed, a direct current motor connected to said second terminal member to rotate the same at a variable speed, a controller for regulating the speed of said second motor above and below the speed of said first motor at which said terminal members rotate in synchronism and said intermediate member is idle, selectively operable means for mechanically connecting said terminal members for rotation in synchronism, and means responsive to a failure of the current supply to either of said motors to render said last mentioned means operative.

14. The combination of a machine element, a differential gearing embodying first and second terminal members and an intermediate member operatively connected to said element, an electric motor connected to said first terminal member to rotate the same, an electric motor connected to said second terminal member to rotate the same, a controller for regulating the speed of said second motor above and below the speed of said first motor at which said terminal members rotate in synchronism and said intermediate member is idle, selectively operable means for mechanically connecting said terminal members for rotation in synchronism, and means responsive to a failure of the current supplied to one of said motors to render said last mentioned means operative.

15. The combination of a machine element, a differential gearing embodying first and second terminal members and an intermediate member operatively connected to said element, an electric motor connected to said first terminal member, an electric motor connected to said second terminal member, a controller for regulating the speed of said second motor above and below the speed of said first motor at which said terminal members rotate in synchronism and said intermediate member is idle, and automatically operable means for connecting said terminal members for rotation in synchronism for a predetermined interval during starting of said motors and then to disconnect the members.

16. In a machine or the like, a reversible variable speed driving mechanism comprising, in combination, differential gearing embodying first and second terminal members and an intermediate member, a driven element operatively connected to said intermediate member, a constant speed driving member connected to said first terminal member, a variable speed electric driving motor connected to said second terminal element and having an energizing circuit, adjusting means including a rheostat in said circuit for varying the speed of said motor above and below a value at which said terminal members are synchronized to maintain said driving member stationary, means including a releasable clutch for positively maintaining said terminal members in synchronism, and means responsive to a setting of said rheostat for synchronous operation automatically to engage said clutch.

17. A reversible variable speed driving mechanism for a machine element having, in combination, a driving shaft, a driving sleeve surrounding said driving shaft coaxially therewith, a sun gear on said driving shaft meshing with a planet gear, a driven member supporting said planet gear for bodily movement about the axis of said driving shaft, a second sun gear on said driving sleeve, a second planet gear meshing with said second sun gear and said ring gear, and a driving member supporting said second planetary gear for bodily movement about the axis of said driving shaft.

18. A reversible variable speed driving mechanism for a machine element having, in combination, a driving shaft, a driving sleeve surrounding said driving shaft coaxially therewith, a sun gear on said driving shaft meshing with a planet gear, a driven member supporting said planet gear for bodily movement about the axis of said driving shaft, a ring gear meshing with said planet gear, a second sun gear on said driving sleeve, a second planet gear meshing with said second sun gear and said ring gear, and a driving member supporting said second planet gear for bodily movement about the axis of said driving shaft and enclosing said sun gears and both of said planet gears.

19. A machine having, in combination, a movable element, power actuated mechanism for advancing the element in opposite directions and at rapid traverse and variable feed rates, a single manually operable control member movable in opposite directions away from a neutral position, means operable in response to movement of said member in opposite directions out of said neutral positions to cause said mechanism to initiate movement of said element and then to increase the rate of feed progressively in the continued movement of the member, and means operable after a predetermined movement of said member to control said mechanism and initiate rapid traverse movement of said element in the same direction as the feed motion then occurring.

WILLIAM F. RIDGWAY.